(12) United States Patent
Lee et al.

(10) Patent No.: US 11,290,630 B2
(45) Date of Patent: Mar. 29, 2022

(54) IMAGING APPARATUS, IMAGING METHOD, AND COMPUTER PROGRAM FOR CAPTURING IMAGE

(71) Applicant: HANWHA TECHWIN CO., LTD., Seongnam-si (KR)

(72) Inventors: Jong Hyeok Lee, Seongnam-si (KR); Jong Kyung Lee, Seongnam-si (KR); Do Won Ko, Seongnam-si (KR); Joong Gyun Jeong, Seongnam-si (KR)

(73) Assignee: HANWHA TECHWIN CO.. LTD., Seongnam-si (KR)

(*) Notice: Subject to any disclaimer, the term of this patent is extended or adjusted under 35 U.S.C. 154(b) by 244 days.

(21) Appl. No.: 16/678,281

(22) Filed: Nov. 8, 2019

(65) Prior Publication Data

US 2020/0154018 A1    May 14, 2020

(30) Foreign Application Priority Data

Nov. 9, 2018 (KR) .......................... 10-2018-0137607

(51) Int. Cl.
| | |
|---|---|
| *H04N 5/225* | (2006.01) |
| *H04N 5/04* | (2006.01) |
| *H04N 5/232* | (2006.01) |
| *H04N 5/262* | (2006.01) |

(52) U.S. Cl.
CPC ............. *H04N 5/2258* (2013.01); *H04N 5/04* (2013.01); *H04N 5/2253* (2013.01); *H04N 5/2254* (2013.01); *H04N 5/2259* (2013.01); *H04N 5/23203* (2013.01); *H04N 5/23238* (2013.01); *H04N 5/23245* (2013.01); *H04N 5/2624* (2013.01)

(58) Field of Classification Search
CPC ...... H04N 5/2258; H04N 5/04; H04N 5/2253; H04N 5/2254; H04N 5/2259; H04N 5/23203; H04N 5/23238; H04N 5/23245; H04N 5/2624
See application file for complete search history.

(56) References Cited

U.S. PATENT DOCUMENTS

| | | | |
|---|---|---|---|
| 10,585,344 B1* | 3/2020 | Lablans | H04N 5/2259 |
| 11,095,810 B2* | 8/2021 | Jung | G06F 3/0486 |
| 11,108,954 B2* | 8/2021 | Jones | H04N 7/181 |
| 2016/0191813 A1* | 6/2016 | Wu | H04N 5/2252 348/159 |
| 2016/0269717 A1* | 9/2016 | Kato | H04N 13/239 |
| 2019/0104253 A1* | 4/2019 | Kawai | H04N 5/23238 |
| 2019/0191059 A1* | 6/2019 | Park | G03B 17/561 |

(Continued)

FOREIGN PATENT DOCUMENTS

| | | |
|---|---|---|
| JP | 2014-82768 A | 5/2014 |
| JP | 2016-90626 A | 5/2016 |

(Continued)

*Primary Examiner* — Antoinette T Spinks
(74) *Attorney, Agent, or Firm* — Sughrue Mion, PLLC

(57) ABSTRACT

An imaging apparatus includes: a frame; a plurality of sensor modules mounted on the frame, wherein each of the sensor modules includes a sensor and a lens having a different optical axis, and is configured to rotate about the optical axis by a predetermined angle to obtain an image; and a processor configured to control the rotation of each of the sensor modules, and connect the images obtained by the sensor modules to generate a connected image.

17 Claims, 7 Drawing Sheets

(56) References Cited

U.S. PATENT DOCUMENTS

| | | | |
|---|---|---|---|
| 2019/0289194 A1* | 9/2019 | Cha | H04N 5/247 |
| 2019/0324352 A1* | 10/2019 | Shin | G03B 17/561 |
| 2019/0327398 A1* | 10/2019 | Shin | G03B 37/04 |
| 2020/0162672 A1* | 5/2020 | Jin | H04N 5/2254 |
| 2020/0236340 A1* | 7/2020 | Lee | H04N 5/2251 |
| 2021/0058556 A1* | 2/2021 | Kim | H04N 5/2257 |

FOREIGN PATENT DOCUMENTS

| | | |
|---|---|---|
| KR | 10-0711570 B1 | 4/2007 |
| KR | 10-1200974 B1 | 11/2012 |
| KR | 10-1411987 B1 | 6/2014 |
| KR | 10-1521109 B1 | 5/2015 |

\* cited by examiner

IMAGING APPARATUS, IMAGING METHOD, AND COMPUTER PROGRAM FOR CAPTURING IMAGE

CROSS-REFERENCE TO THE RELATED APPLICATION

This application claims priority from Korean Patent Applications No. 10-2018-0137607, filed on Nov. 9, 2018, in the Korean Intellectual Property Office, the disclosure of which is incorporated herein in its entirety by reference.

BACKGROUND

1. Field

One or more embodiments relate to an imaging apparatus, an imaging method, and a computer program for capturing image, and more particularly, to an imaging apparatus capable of generating a connected image of a plurality of images with a plurality of viewing angles according to sensor rotating directions of a plurality of sensor modules, an imaging method, and a computer program for capturing images.

2. Description of Related Art

Recently, the development of information and communication technology has enabled wide use of imaging apparatuses such as a surveillance camera for various purposes, and configuration and type of the imaging apparatuses become more diverse.

In particular, one imaging apparatus acts as a plurality of imaging apparatuses or an imaging apparatus provided with a plurality of sensor modules for obtaining images of greater viewing angles has been developed. Accordingly, a method of efficiently operating an imaging apparatus is demanded.

SUMMARY

According to one or more embodiments of the inventive concept, an improved connected image may be generated by combining partial images obtained by a plurality of sensor modules included in an imaging apparatus.

One or more embodiments of the inventive concept provide an imaging apparatus capable of providing a connected image obtained from a plurality of viewing angles.

Various aspects of the inventive concept will be set forth in part in the description which follows and, in part, will be apparent from the description, or may be learned by practice of the presented embodiments herein.

According to an aspect of an embodiment, there is provided an imaging apparatus which may include: a frame; a plurality of sensor modules mounted on the frame, wherein each of the sensor modules includes a sensor and a lens having a different optical axis, and is configured to rotate about the optical axis by a predetermined angle to obtain an image; and a processor configured to control the rotation of each of the sensor modules, and connect the images obtained by the sensor modules to generate a connected image.

Each of the sensors may include an imaging area having a rectangular shape defined by a side having a long length and a side having a short length, and each of the sensor modules may be configured to obtain the image by sequentially exposing the imaging area of the sensor in a short-length direction in units of pixel rows.

In a first photographing mode in which the sensor modules rotate such that sides having the long length in the imaging areas of the sensors of two adjacent sensor modules are adjacent to each other, exposed areas on the imaging areas the sensors of the two adjacent sensor modules may move away from or closer to each other.

In a second photographing mode in which the sensor modules rotate such that sides having the short length in the imaging areas of the sensors of two adjacent sensor modules are adjacent to each other, exposed areas on the imaging areas of the sensors of the sensor modules may move in a same direction.

The optical axis of each of the sensor modules may be maintained during the rotations of the sensor module. The frame may have a plurality of surfaces facing different directions, and the sensor modules may be respectfully mounted on the surfaces to have the different optical axes.

The processor may determine a photographing mode of the imaging apparatus to be one of a first photographing mode and a second photographing mode based on a signal transmitted from a user terminal, and may rotate the plurality of sensor modules in response to the determined photographing mode.

The sensor modules may be mounted on the frame such that optical axes between two adjacent sensor modules have a certain angle.

Each of the plurality of sensor modules may include a base stopper configured to restrict a rotating angle thereof by contacting a frame stopper included in the frame on a moving path of the sensor module according to the rotating of the sensor module. The frame may include the frame stopper configured to restrict the rotating angle of each of the plurality of sensor modules by contacting the base stopper.

The base stopper may be provided to allow the adjacent sensor modules to rotate in opposite directions to each other.

According to an aspect of an embodiment, there is provided an imaging apparatus which may include: a plurality of sensor modules each of which includes a sensor and a lens configured to rotate about a different optical axis to obtain an image according to one of a plurality of photographing modes; and a processor configured to control the rotation of the sensor modules, and connect the images obtained by the sensor modules to generate a connected image, wherein the photographing modes comprise: a first photographing mode in which the connected image is generated by connecting long sides of the images obtained by the sensors of two adjacent sensor modules; and a second photographing mode in which the connected image is generated by connecting short sides of the images obtained by the sensors of two adjacent sensor modules. In at least one of the first and second photographing modes, the processor may be configured to control the rotation of the sensor modules such that an exposure time of a side portion of an imaging area of a sensor of a first sensor module among the sensor modules is synchronized with an exposure time of a side portion of an imaging area of a sensor of a second sensor module adjacent to the first sensor module among the sensor modules.

According to an aspect of an embodiment, there is provided an imaging method performed by an imaging apparatus including a plurality of sensor modules each of which includes a sensor and a lens having a different optical axis. The method may include: determining a photographing mode of the imaging apparatus from among at least one of photographing mode; controlling, according to the determined photographing mode, each of the sensor modules to obtain an image by sequentially exposing a rectangular-shaped imaging area of the sensor in a short-length direction in units of pixel rows; and generating a connected image based on the images obtained by the sensor modules The photographing mode may be determined based on a photographing mode control signal transmitted from a user terminal.

Each of the sensor modules may be controlled to obtain the image by rotating about the optical axis, based on the photographing mode control signal.

In a first photographing mode in which the sensor modules may rotate such that sides having a long length in the imaging areas of the sensors of two adjacent sensor modules are adjacent to each other, the image is obtained by sequentially exposing the imaging area of the sensor in the short-length direction so that exposed areas on the imaging areas of the sensors of the two adjacent sensor modules move away from or closer to each other.

In a second photographing mode in which the sensor modules may rotate such that sides having a short length in the imaging areas of the sensors of two adjacent sensor modules are adjacent to each other, the image is obtained by sequentially exposing the imaging area of the sensor in the short-length direction so that exposed areas on the imaging areas of the sensors of the sensor modules move in a same direction.

Other aspects, features and advantages of the embodiments will become better understood through the accompanying drawings, the claims and the detailed description.

BRIEF DESCRIPTION OF THE DRAWINGS

The above and other aspects, features, and advantages of the embodiments of the inventive concept will be more apparent from the following description taken in conjunction with the accompanying drawings, in which.

DETAILED DESCRIPTION

Figure 1:
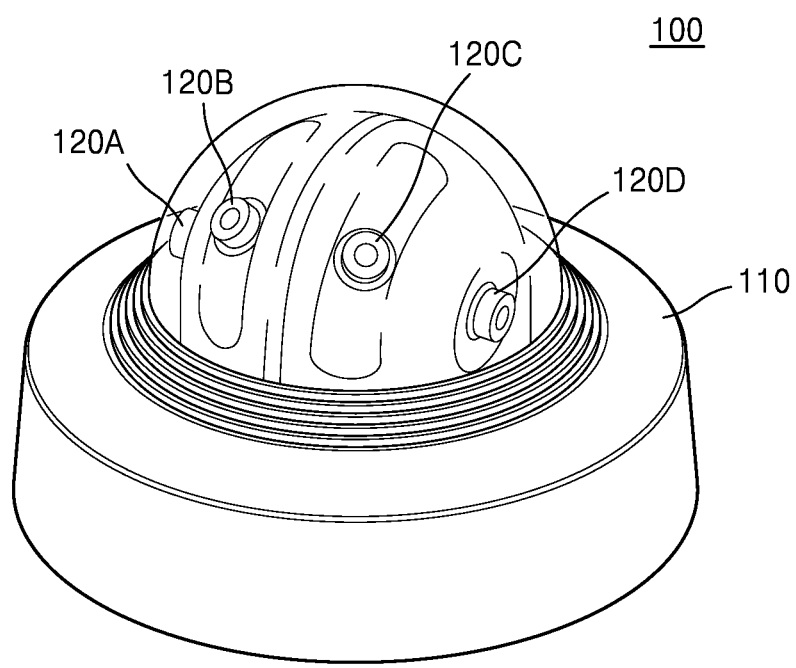
FIG. 1 is a diagram of an imaging apparatus according to an embodiment.

Reference will now be made in detail to embodiments, which are illustrated in the accompanying drawings, wherein like reference numerals refer to like elements throughout. In this regard, the embodiments presented herein, which are all exemplary, may have different forms and should not be construed as being limited to the descriptions set forth herein. Accordingly, the embodiments are merely described below, by referring to the figures, to explain aspects of the inventive concept. As used herein, the term "and/or" includes any and all combinations of one or more of the associated listed items. Expressions such as "at least one of," when preceding a list of elements, modify the entire list of elements and do not modify the individual elements of the list.

The embodiments will be described below in more detail with reference to the accompanying drawings. Those components that are the same or are in correspondence are rendered the same reference numeral regardless of the figure number, and redundant explanations are omitted.

While such terms as "first," "second," etc., may be used to describe various components, such components are not be limited to the above terms. The above terms are used only to distinguish one component from another. An expression used in the singular encompasses the expression of the plural, unless it has a clearly different meaning in the context. In the present specification, it is to be understood that the terms "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. Sizes of components in the drawings may be exaggerated for convenience of explanation. In other words, since sizes and shapes of components in the drawings are arbitrarily illustrated for convenience of explanation, the inventive concept is not limited thereto.

FIG. 1 is a diagram of an imaging apparatus 100 according to an embodiment.

The imaging apparatus 100 according to the embodiment may generate a connected image of images from a plurality of viewing angles according to sensor rotating directions of a plurality of sensor modules 120A, 1208, 120C, and 120D.

The sensor modules 120A, 1208, 120C, and 120D may represent sensor assemblies each including respective sensors for obtaining images (or imaging sensor). The sensor modules will be described later with reference to FIGS. 2 to 4.

In one or more embodiments, a partial image may indicate an image obtained by each of the sensor modules 120A, 1208, 120C, and 120D. For example, a partial image may be an image obtained by the sensor module 120A. The partial image may be used as a portion of a connected image that will be described later.

In one or more embodiments, a connected image is an image obtained by combining partial images obtained by two or more sensors based on a connecting relation between the partial images, for example, a panorama image. For example, as shown in FIG. 1, when the imaging apparatus 100 includes four sensor modules 120A, 120B, 120C, and 120D, the connected image may be an image obtained by connecting images obtained by four sensor modules 120A, 120B, 120C, and 120D in a longitudinal or transverse direction. The connected image may be generated by a processor that will be described later.

The imaging apparatus 100 according to an embodiment may include a frame 110, the sensor modules 120A, 120B, 120C, and 120D, and a processor (not shown).

The sensor modules 120A, 120B, 120C, and 120D may be mounted on the frame 110, so that each of the sensors in the sensor modules 120A, 120B, 120C, and 120D may be rotated by a predetermined angle while maintaining an optical axis thereof. Here, the optical axis may indicate a central axis of a lens unit included in the sensor module.

Therefore, the frame 110 according to an embodiment may allow the sensor modules 120A, 120B, 120C, and 120D to obtain a wide image in a horizontal direction or a vertical direction based on the optical axis.

Each of the sensor modules 120A, 120B, 120C, and 120D according to the embodiment may be mounted on the frame 110 to obtain a partial image that is necessary to generate a connected image.

Figure 2:
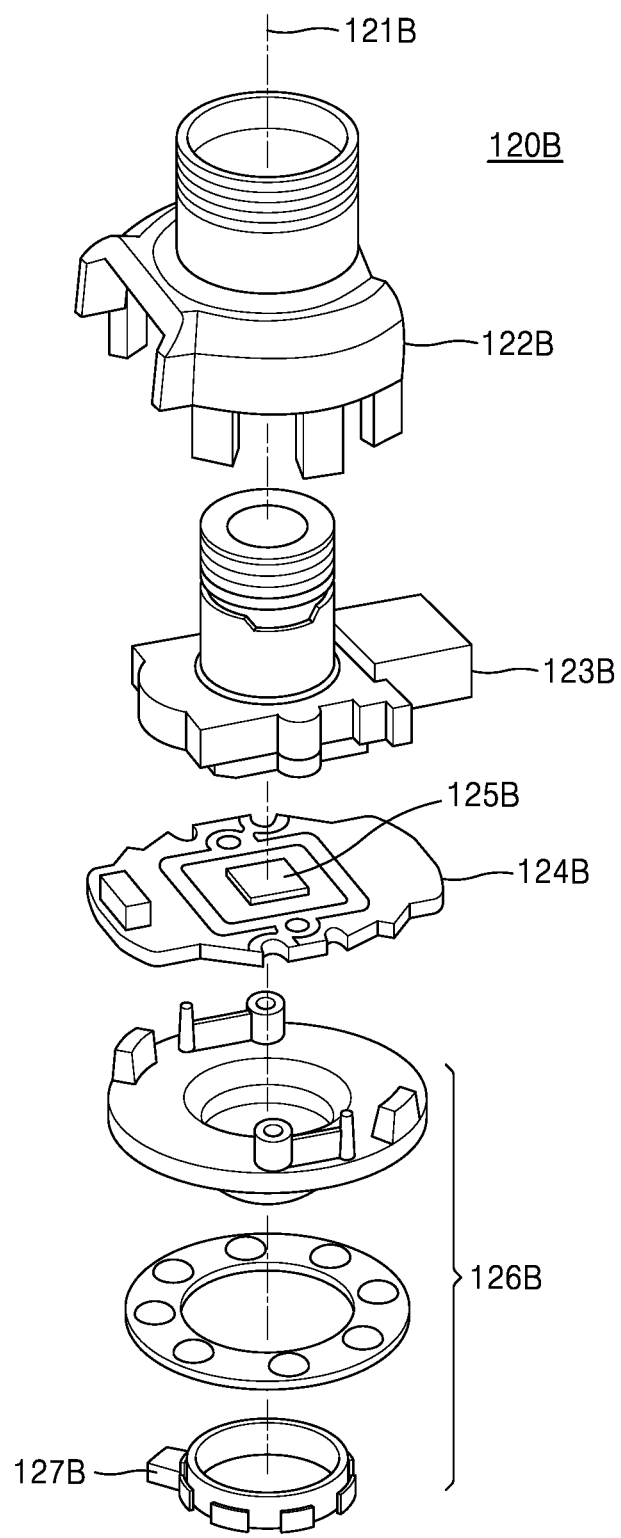
FIG. 2 is a block diagram of a sensor module according to an embodiment.

FIG. 2 is a block diagram of the sensor module 120B according to the embodiment.

Referring to FIG. 2, the sensor module 120B according to the embodiment may include a handle portion 122B, a lens unit 123B, a sensor portion 124B, other elements 126B, and a base stopper 127B.

The handle portion 122B according to the embodiment may allow a user to rotate the sensor module 120B about an optical axis 121B. The handle portion 122B may be integrally coupled to other elements (123B, 124B, 126B, and 127B) that will be described later to be used to rotate the sensor module 120B according to a manipulation of the user. A rotation angle caused by the handle portion 122B may be restricted by a frame stopper and the base stopper 127B. This will be described later.

The lens unit 123B according to the embodiment may include one or more lens and an optical element (not shown) that may adjust light to allow a sensor 125B in the sensor portion 124B to obtain an image. A central axis of the lens of the lens unit 123B may correspond to the optical axis 121B, and the lens unit 123B may rotate about the optical axis 121B according to the manipulation of the user on the handle portion 122B.

The sensor portion 124B according to the embodiment may include a circuit board on which the sensor 125B is mounted for obtaining images. A central point of the sensor 125B may be located on the optical axis 121B. The sensor portion 124B may rotate about the optical axis 121B according to the manipulation of the user with respect to the handle portion 122B.

The other elements 126B according to the embodiment may include one or more units to which the elements such as the lens unit 123B are integrally coupled to configure the sensor module 120B.

The base stopper 127B according to the embodiment is in contact with the frame stopper included in the frame 110 on a moving passage of the sensor module 120B according to the rotation of the sensor module 120B to restrict the rotating angle of the sensor module 120B. The frame stopper will be described later.

Although FIG. 2 only shows a configuration of the sensor module 120B as an example, the other sensor modules 120A, 120C, and 120D may have the same structures as that of the sensor module 120B.

Figure 3:
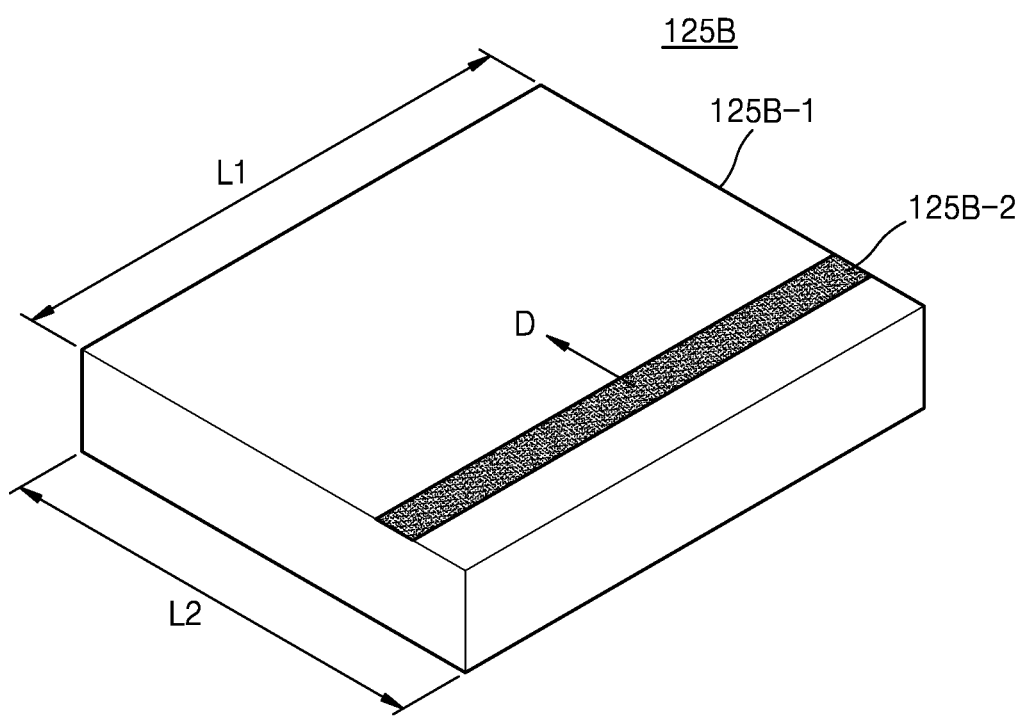
FIG. 3 is a diagram of a sensor included in a sensor portion of the sensor module according to an embodiment.

FIG. 3 is a diagram of the sensor 125B included in the sensor portion 124B of the sensor module 120B according to an embodiment.

Referring to FIG. 3, the sensor 125B according to the embodiment may include an imaging area 125B-1 having a rectangular shape that is defined by a side having a first length L1 and a side having a second length L2 that is smaller than the first length L1. Here, the imaging area 125B-1 may include a plurality of pixels that are arranged with predetermined intervals.

The sensor 125B according to the embodiment may capture an image by sequentially exposing the imaging area 125B-1 of the sensor 125B in units of pixel rows each having the first length L1 in a direction (D) of the second length L2. In other words, the sensor 125B may capture an image by moving an exposed area 125B-2 in the direction D of the second length L2 on the imaging area 125B-1. For example, the sensor 125B may obtain an image by a rolling shutter method. Here, the exposed area 125B-2 may represent an area in the sensor 125B which is exposed to light through a corresponding lens.

Although FIG. 3 shows the sensor portion 124B in the sensor module 120B as an example, sensor portions in the other sensor modules 120A, 120C, and 120D may have the same structures as that of the sensor portion 124B.

Figure 4:
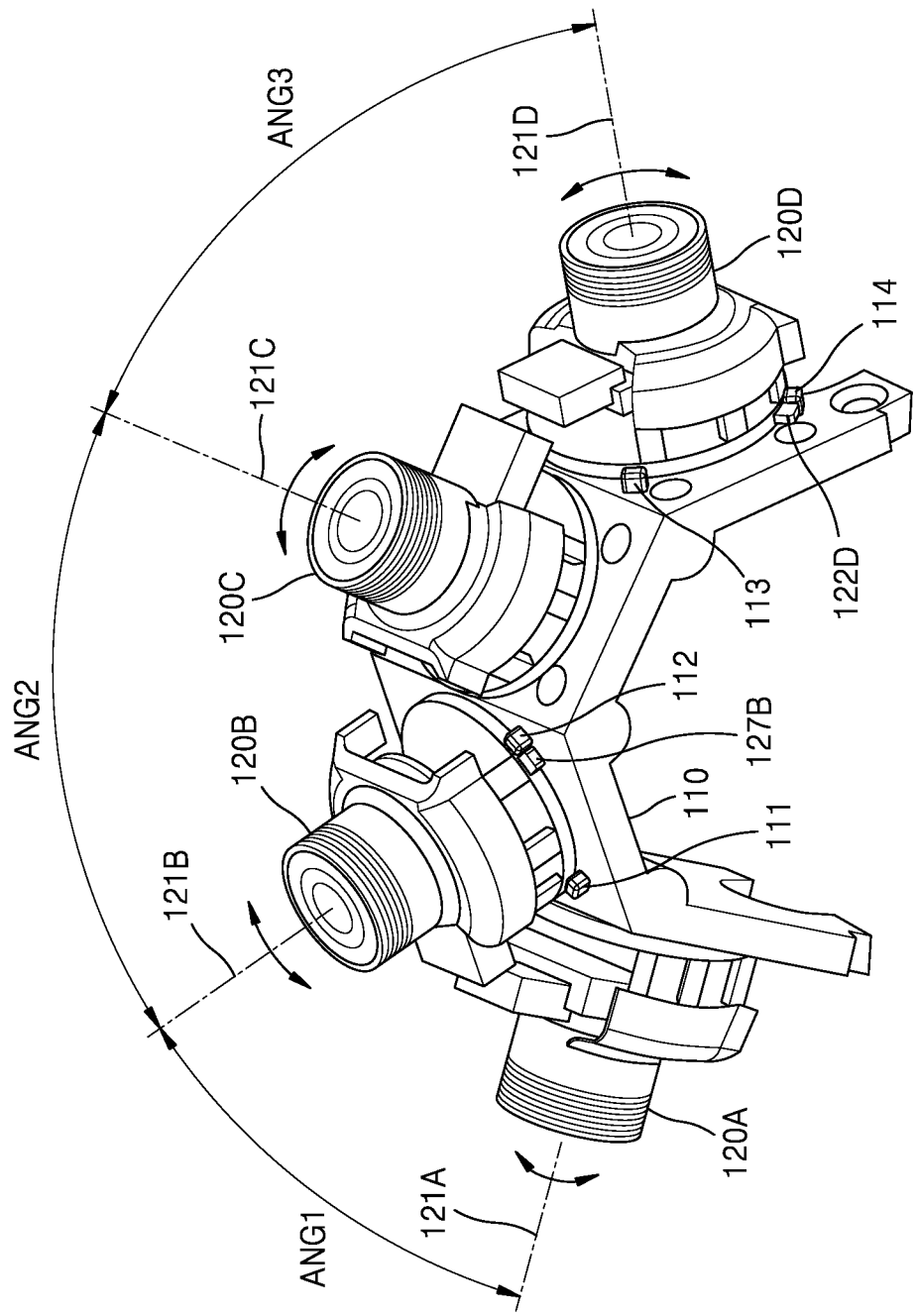
FIG. 4 is a diagram showing a portion of a frame according to an embodiment, that is, fixed portions of a plurality of sensor modules.

FIG. 4 is a diagram showing a portion of the frame 110 according to an embodiment, that is, fixed portions of the sensor modules 120A, 120B, 120C, and 120D.

As described above, the sensor modules 120A, 120B, 120C, and 120D may be mounted on the frame 110 according to the embodiment, so that the sensors may rotate by a predetermined angle while maintaining the optical axes 121A, 121B, 121C, and 121D. For example, the sensor module 120B may be mounted on the frame 110 to rotate by a predetermined angle while maintaining a central point of the sensor 125B on the optical axis 121B.

Each of the sensor modules 120A, 120B, 120C, and 120D may be mounted on the frame 110 according to the embodiment such that the adjacent sensor modules may make predetermined angle ANG1, ANG2, or ANG3 between the optical axes thereof.

For example, two sensor modules 120A and 120B may be mounted on the frame 110 so that the angle ANG1 between the optical axis of the sensor module 120A and the optical axis of the sensor module 120B may be 60° angle. Also, similarly, two sensor modules 120B and 120C may be mounted on the frame 110 so that the angle ANG2 between the optical axis of the sensor module 120B and the optical axis of the sensor module 120C is 60°, and two sensor modules 120C and 120D may be also mounted on the frame 110 so that the angle ANG3 between the optical axis of the sensor module 120C and the optical axis of the sensor module 120D is 60°. However, the angle between the optical axes is an example, and the inventive concept is not limited thereto, that is, the angles between the optical axes among the sensor modules may be different from each other.

The frame 110 according to the embodiment may include a plurality of frame stoppers. For example, the frame 110 on which the sensor modules 120B and 120C are mounted have first to fourth frame stoppers 111, 112, 113, and 114 that respectively restrict rotating angles of the sensor modules 120B and 120D. Although not shown, portions of the frame 110 on which the sensor modules 120A and 120C are mounted may also have four frame stoppers similar to the first to fourth frame stoppers 111, 112, 113, and 114. Each of the sensor modules 120A, 120B, 120C, and 120D may include a base stopper that is designed to contact with corresponding frame stoppers on a moving path according to the rotating thereof.

For example, with respect to the sensor module 120B, the frame 110 may include a first frame stopper 111 and a second frame stopper 112 that are designed to contact with the base stopper 127B included in the sensor module 120B on the moving path of the sensor module 120B according to the rotation of the sensor module 120B. The frame 110 may include frame stoppers 113 and 114 with respect to the sensor module 120D and frame stoppers (not shown) with respect to the sensor module 120A and the sensor module 120C.

The frame stoppers according to the embodiment may be arranged to make a rotating range of each of the sensor modules 120A, 120B, 120C, and 120D have a predetermined angle on a path through which the base stopper moves.

For example, the frame 110 may include the first frame stopper 111 and the second frame stopper 112 that restrict the rotating angle of the sensor module 120B within a range of 0° to 90°. Accordingly, the base stopper 127B of the sensor module 120B may maintain a state thereof by contacting the first frame stopper 111 when a rotating angle of the sensor module 120B is 0°. In addition, the base stopper 127B of the sensor module 120B may maintain a rotated state of the sensor module 120B by contacting the second frame stopper 112 when the rotating angle of the sensor module 120B is 90°, as shown in FIG. 4. However, the inventive concept is not limited to the above range of the rotating angle.

In the embodiment, the frame stoppers of the frame 110 may be provided such that adjacent sensor modules may rotate in opposite directions to each other based on a predetermined reference direction in each photographing mode. For example, the frame stoppers (not shown) with respect to the sensor module 120A may allow the sensor module 120A to rotate in a counter-clockwise direction based on a reference direction, that is, 0° direction. In addition, the first and second frame stoppers 111 and 112 with respect to the sensor module 120B may allow the sensor module 120B to rotate in a clockwise direction based on the reference direction, that is, 0° direction.

The frame stopper (not shown) with respect to the sensor module 120C may allow the sensor module 120C to rotate in the counter-clockwise direction like the sensor module 120A. The frame stoppers 113 and 114 with respect to the sensor module 120D may allow the sensor module 120D to rotate in the clockwise direction. However, the rotating direction of each sensor module is an example, and the inventive concept not limited thereto.

Here, the frame 110 according to the embodiment may further include a guide portion (not shown) that allows the sensor module 120B to maintain the rotated state at a certain angle. For example, the frame 110 may further include the guide portion (not shown) that allows the sensor module 120B to maintain the rotated state only at the angles of 0° and 90°, based on a predetermined reference angle (e.g., 0°).

In addition, the sensor modules 120A, 120B, 120C, and 120D may be mounted on the frame 110 such that the optical axes 121A, 121B, 121C, and 121D of the sensor modules 120A, 120B, 120C, and 120D may be located on one plane. Here, the directions of the optical axes may be different from one another as shown in FIG. 4.

The user may manipulate the sensor modules 120A, 120B, 120C, and 120D to make the rotating angles of the sensor modules 120A, 120B, 120C, and 120D may have 0° or 90° angle. For example, the user may apply external power to the handle portions of the sensor modules 120A, 120B, 120C, and 120D, and then the sensor modules 120A, 120B, 120C, and 120D may be switched to a rotated state at 90° from 0° or at 0° from 90°.

In addition, in the embodiment, the frame 110 may include the frame stoppers that allow the adjacent sensor modules to rotate in opposite directions, as described above. Therefore, the user may apply the external force based on the rotatable direction of each of the sensor modules 120A, 120B, 120C, and 120D.

In the present embodiment referring to FIG. 4, only four sensor modules 120A, 120B, 120C, and 120D are mounted on the frame 110. However, the number of the sensor modules is not limited thereto. That is, more or less than four sensor modules may be mounted on the frame 110 according to other embodiments to implement the same inventive concept.

In the present embodiment referring to FIGS. 1 and 4, the frame 110 is structured to have four surfaces facing different directions such that the four sensor modules 120A, 120B, 120C, and 120D are respectively mounted on these four surfaces to have different optical axes. However, the inventive concept is not limited thereto as long as the four sensor modules 120A, 120B, 120C, and 120D can have different optical axes when mounted on the frame 110.

Figure 5:
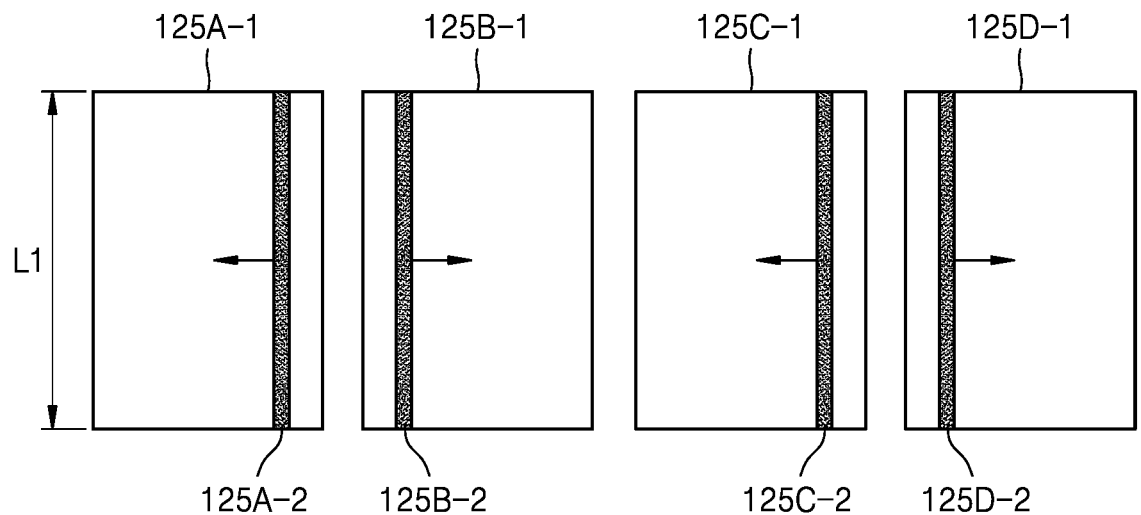
FIG. 5 is a diagram showing a state in which a plurality of sensor modules rotate in a first photographing mode.
Figure 6:
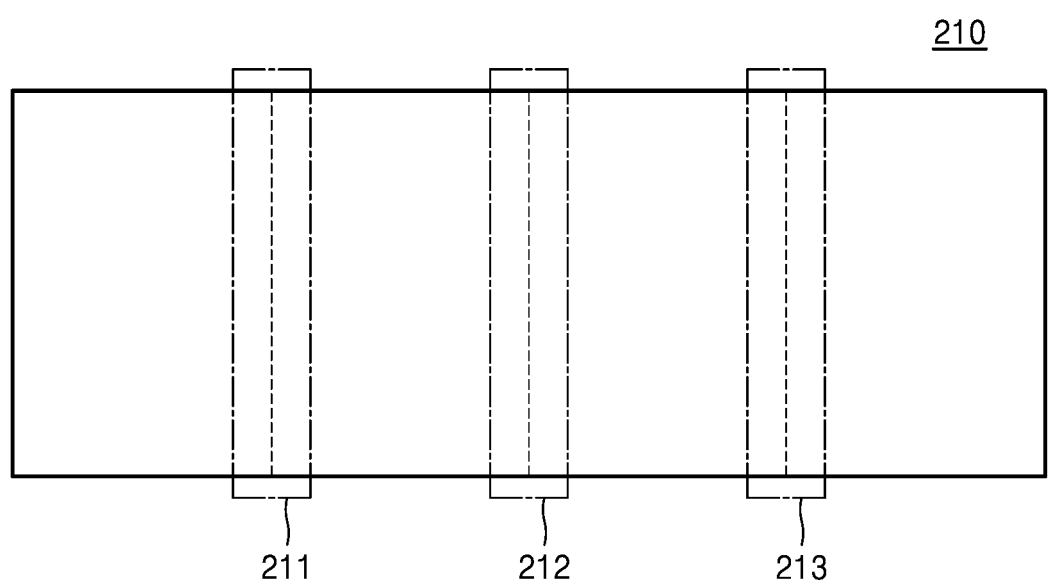
FIG. 6 is a diagram showing a connected image obtained in a first photographing mode by an imaging apparatus according to an embodiment.
Figure 7:
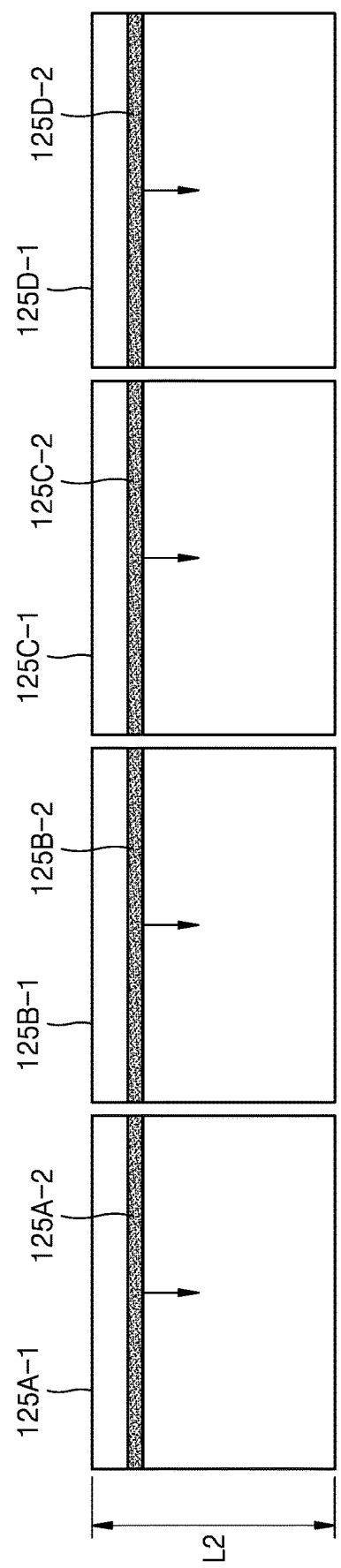
FIG. 7 is a diagram showing a state in which a plurality of sensor modules rotate in a second photographing mode.
Figure 8:
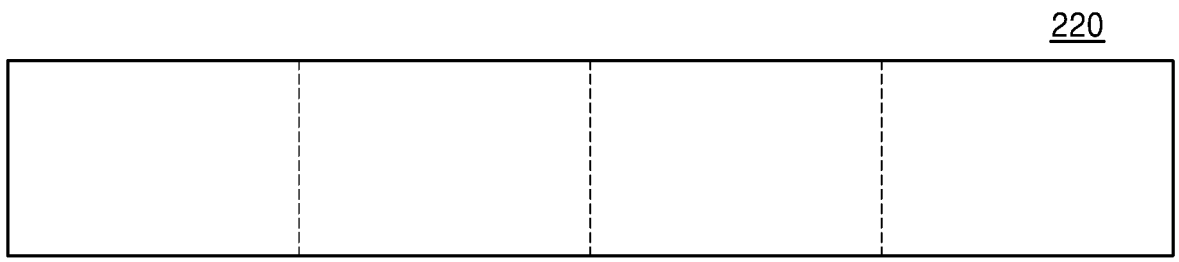
FIG. 8 is a diagram showing a connected image obtained in a second photographing mode by an imaging apparatus according to an embodiment.

FIG. 5 is a diagram showing a state in which the sensor modules 120A, 120B, 120C, and 120D rotate in a first photographing mode. FIG. 6 is a diagram showing a connected image obtained in the first photographing mode by the imaging apparatus 100 according to an embodiment. FIG. 7 is a diagram showing a state in which the sensor modules 120A, 120B, 120C, and 120D rotate in a second photographing mode. FIG. 8 is a diagram showing a connected image obtained in the second photographing mode by the imaging apparatus 100 according to an embodiment.

In the first photographing mode, imaging areas 125A-1, 125B-1, 125C-1, and 125D-1 of the sensors 125A, 125B, 125C, and 125D, of the sensor modules 120A, 120B, 120C, and 120D, respectfully, according to the embodiment may be arranged as shown in FIG. 5.

In the first photographing mode, the sensor modules 120A, 120B, 120C, and 120D may be in the rotated states such that sides having the first length L1 may be adjacent to each other between the imaging areas of the sensors of the adjacent sensor modules. Here, the exposed areas on the imaging areas of the sensors of the adjacent sensor modules may move away from or closer to each other.

For example, in a case of the imaging areas 125A-1 and 125B-1 of the sensors 125A and 125B of the two adjacent sensor modules 120A and 120B, exposed areas 125A-2 and 125B-2 may move away from each other.

Also, in a case of the imaging areas 125B-1 and 125C-1 of the sensors 125B and 125C of the two adjacent sensor modules 120B and 120C, exposed areas 125B-2 and 125C-2 may move closer to each other.

As described above, according to the sensor modules 120A, 120B, 120C, and 120D of the embodiment, an exposure time of a side portion 211, 212, or 213 (see FIG. 6) of the imaging area 125A-1, 125B-1, 125C-1, or 125D-1 is synchronized with an exposure time of the imaging area 125A-1, 125B-1, 125C-1, or 125D-1 to obtain a more natural connected image.

In addition, in the first photographing mode, the imaging apparatus 100 according to the embodiment may generate a connected image 210 having a longer longitudinal side and a shorter transverse side, as compared with a connected image 220 (see FIG. 8) generated in the second photographing mode. Therefore, the first photographing mode may be used when a viewing angle extending in the longitudinal direction is necessary.

In the second photographing mode, imaging areas 125A-1, 125B-1, 125C-1, and 125D-1 of the sensors 125A, 125B, 125C, and 125D of the sensor modules 120A, 120B, 120C, and 120D, respectfully, according to the embodiment may be arranged as shown in FIG. 7.

In the second photographing mode, the sensor modules 120A, 120B, 120C, and 120D may be in the rotated states such that that sides of the second length L2 may be adjacent to each other between the imaging areas of the sensors of the adjacent sensor modules. Here, the exposed areas 125A-2, 125B-2, 125C-2, and 125D-2 on the imaging areas 125A-1, 125B-1, 125C-1, and 125D-1 of the sensors 125A, 125B, 125C, and 125D of the sensor modules 120A, 120B, 120C, and 120D, respectfully, may move in the same direction.

In addition, in the second photographing mode, the imaging apparatus 100 according to the embodiment may generate the connected image 220 having a longer transverse side and a shorter longitudinal side, as compared with the connected image 210 (see FIG. 6) generated in the first photographing mode. Therefore, the second photographing mode may be used when a viewing angle extending in the transverse direction is necessary.

A processor (not shown) according to the embodiment may generate a connected image such as the connected image 210 of FIG. 6 and the connected image 220 of FIG. 8 by using the partial images obtained by the sensor modules 120A, 120B, 120C, and 120D.

Here, the processor may include all kinds of devices capable of processing data including image processing, not being limited thereto. For example, the processor may be a data processing device built in hardware, and includes a physically structured circuit for executing functions expressed as codes or commands included in a program.

The data processing device built into the hardware may include one or more of a microprocessor, a central processing unit (CPU), a processor core, a multiprocessor, an application-specific integrated circuit (ASIC), a field programmable gate array (FPGA), etc., but the scope of the inventive concept is not limited thereto. The processor may include a single processor or a plurality of processors.

Although not shown in the drawings, the imaging apparatus 100 according to the embodiment may further include an actuator module and a memory.

The actuator module according to the embodiment may rotate the sensor modules 120A, 120B, 120C, and 120D by a predetermined angle. Here, the actuator module may rotate the sensor modules 120A, 120B, 120C, and 120D by the predetermined angle based on control of the processor. For example, the processor according to the embodiment may determine an operation mode of the imaging apparatus 100 as one of the first photographing mode and the second photographing mode based on a signal transmitted from a user terminal (not shown), and then, may control the actuator module to make the sensor modules 120A, 120B, 120C, and 120D rotate corresponding to the determined photographing mode.

Figure 9:
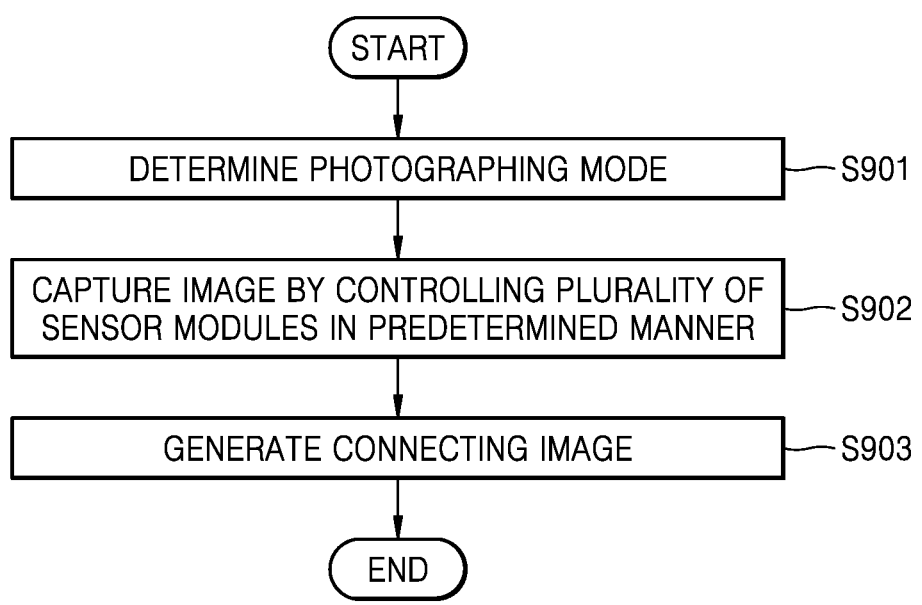
FIG. 9 is a flowchart illustrating an imaging method performed by an imaging apparatus according to an embodiment.

FIG. 9 is a flowchart illustrating an imaging method performed by the imaging apparatus 100, according to an embodiment. Hereinafter, descriptions provided above with reference to FIGS. 1 to 8 are omitted, and FIGS. 1 to 8 may be also referred to.

The imaging apparatus 100 according to the embodiment may determine the photographing mode thereof (S901).

For example, the imaging apparatus 100 may determine the photographing mode thereof based on a photographing mode control signal transmitted from a user terminal (not shown).

Also, the imaging apparatus 100 may identify the rotated states of the sensor modules 120A, 120B, 120C, and 120D, and determine the photographing mode based on an identification result.

In an embodiment, the imaging apparatus 100 may rotate the sensor modules 120A, 120B, 120C, and 120D based on a photographing mode control signal transmitted from the user terminal (not shown). Here, the imaging apparatus 100 may rotate the sensor modules 120A, 120B, 120C, and 120D by using the actuator (not shown).

The imaging apparatus 100 according to the embodiment may capture an image by controlling the sensor modules 120A, 120B, 120C, and 120D in a predetermined manner (S902). Here, the sensor included in each of the sensor modules 120A, 120B, 120C, and 120D may have a rectangular imaging area defined by a side having the first length L1 and a side having the second length L2 that is smaller than the first length L1, as described above with reference to FIG. 3.

When the photographing mode determined in operation S901 is the first photographing mode, the imaging apparatus 100 according to the embodiment captures images by exposing the imaging area of the sensor sequentially in the direction of the second length L2 in units of the pixel rows having the first length L1, while moving the exposed areas on the imaging areas of the sensors of the adjacent sensor modules to move away from or closer to each other. Here, the first photographing mode may be a mode in which the sensor modules 120A, 120B, 120C, and 120D are in the rotated states such that the sides having the first length L1 of the imaging areas are adjacent to each other between the adjacent sensor modules.

In the first photographing mode, imaging areas 125A-1, 125B-1, 125C-1, and 125D-1 of the sensors 125A, 125B, 125C, and 125D of the sensor modules 120A, 120B, 120C, and 120D, respectfully, according to the embodiment may be arranged as shown in FIG. 5.

In the first photographing mode, the sensor modules 120A, 120B, 120C, and 120D may be in the rotated states such that sides of the first length L1 may be adjacent to each other between the imaging areas of the sensors of the adjacent sensor modules. Here, the exposed areas on the imaging areas of the sensors of the adjacent sensor modules may move away from or closer to each other.

For example, in a case of the imaging areas 125A-1 and 125B-1 of the sensors 125A and 125B of the two adjacent sensor modules 120A and 120B, respectfully—exposed areas 125A-2 and 125B-2 may move away from each other.

Also, in a case of the imaging areas 125B-1 and 125C-1 of the sensors 125B and 125C of the two adjacent sensor modules 120B and 120C, exposed areas 125B-2 and 125C-2 may be move closer to each other.

As described above, according to the sensor modules 120A, 120B, 120C, and 120D of the embodiment, an exposure time of a side portion 211, 212, or 213 (see FIG. 6) of the imaging area 125A-1, 125B-1, 125C-1, or 125D-1 is synchronized with an exposure time of the imaging area 125A-1, 125B-1, 125C-1, or 125D-1 to obtain a more natural connected image.

In addition, in the first photographing mode, the imaging apparatus 100 according to the embodiment may generate a connected image 210 having a greater longitudinal side and a shorter transverse side, as compared with a connected image 220 (see FIG. 8) generated in the second photographing mode. Therefore, the first photographing mode may be used when a viewing angle extending in the longitudinal direction is necessary.

In addition, when the photographing mode determined in operation S901 is the second photographing mode, the imaging apparatus 100 according to the embodiment captures images by exposing the imaging area of the sensor sequentially in the direction of the second length L2 in units of the pixel rows having the first length L1, while moving the exposed areas on the imaging areas of the sensors 125A, 125B, 125C, and 125D of the sensor modules 120A, 120B, 120C, and 120D, respectfully, in the same direction. Here, the second photographing mode may denote a mode in which the sensor modules 120A, 120B, 120C, and 120D are in the rotated states so that the sides having the second length L2 of the imaging areas are adjacent to each other between the adjacent sensor modules.

In the second photographing mode, imaging areas 125A-1, 125B-1, 125C-1, and 125D-1 of the sensors 125A, 125B, 125C, and 125D of the sensor modules 120A, 120B, 120C, and 120D, respectfully, according to the embodiment may be arranged as shown in FIG. 7.

In the second photographing mode, the sensor modules 120A, 120B, 120C, and 120D may be in the rotated states so that sides of the second length L2 may be adjacent to each other between the imaging areas of the sensors of the adjacent sensor modules. Here, the exposed areas 125A-2, 125B-2, 125C-2, and 125D-2 on the imaging areas 125A-1, 125B-1, 125C-1, and 125D-1 of the sensors 125A, 125B, 125C, and 125D of the sensor modules 120A, 120B, 120C, and 120D, respectfully, may move in the same direction.

In addition, in the second photographing mode, the imaging apparatus 100 according to the embodiment may generate the connected image 220 having a greater transverse side and a shorter longitudinal side, as compared with the connected image 210 (see FIG. 6) generated in the first photographing mode. Therefore, the second photographing mode may be used when a viewing angle extending in the transverse direction is necessary.

The imaging apparatus 100 according to the embodiment may generate the connected image based on images obtained respectively by the sensor modules 120A, 120B, 120C, and 120D according to the photographing mode.

For example, in the first photographing mode, the imaging apparatus 100 may obtain the connected image with a viewing angle expanded in the longitudinal direction as shown in FIG. 6. In addition, in the second photographing mode, the imaging apparatus 100 may obtain the connected image with a viewing angle expanded in the transverse direction as shown in FIG. 8.

The memory (not shown) according to the embodiment may temporarily or permanently store data, instructions, programs, program code processed by the processor, or a combination thereof. The memory may include a magnetic storage medium or a flash storage medium, but the inventive concept not limited thereto.

In addition, the memory may further store signals for controlling operations of the actuator in each photographing mode and reference data (e.g., a lookup table) for generating the connected image by connecting partial images in each photographing mode, in addition to the above data. However, the inventive concept is not limited to the above examples.

The particular implementations shown and described herein are illustrative examples of the inventive concept, and are not intended to otherwise limit the scope of the inventive concept in any way. For the sake of brevity, electronics, control systems, software, and other functional aspects of the systems according to the related art may not be described in detail. Furthermore, the connecting lines or connectors shown in the drawings are intended to represent example functional relationships and/or physical or logical couplings between the various elements. It should be noted that many alternative or additional functional relationships, physical connections, or logical connections may be present in a practical device. Moreover, no item or component is essential to the practice of the embodiments unless the element is specifically described as "essential" or "critical".

According to the embodiment, when the connected image is generated by combining partial images obtained by the sensor modules included in the imaging apparatus, the exposure time of the side in the imaging area of a sensor of each sensor module is synchronized with the exposure time of the imaging area in a sensor of an adjacent sensor module to obtain a natural connected image.

Also, according to the embodiment, the connecting images with a plurality of viewing angles may be provided without correcting the posture of the imaging apparatus.

It should be understood that the embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the inventive concept as defined by the following claims.

What is claimed is:

1. An imaging apparatus comprising:
a frame;
a plurality of sensor modules mounted on the frame, wherein each of the sensor modules comprises a sensor and a lens having a different optical axis, and is configured to rotate about the optical axis by a predetermined angle to obtain an image; and
a processor configured to control the rotation of each of the sensor modules, and connect the images obtained by the sensor modules to generate a connected image,
wherein each of the sensors comprises an imaging area having a rectangular shape defined by a side having a long length and a side having a short length,
wherein each of the sensor modules is configured to obtain the image by sequentially exposing the imaging area of the sensor in a short-length direction in units of pixel rows, and
wherein, in a first photographing mode in which the sensor modules rotate such that sides having the long length in the imaging areas of the sensors of two adjacent sensor modules are adjacent to each other, exposed areas on the imaging areas the sensors of the two adjacent sensor modules move away from or closer to each other.

2. The imaging apparatus of claim 1, wherein, in a second photographing mode in which the sensor modules rotate such that sides having the short length in the imaging areas of the sensors of two adjacent sensor modules are adjacent to each other, exposed areas on the imaging areas of the sensors of the sensor modules move in a same direction.

3. The imaging apparatus of claim 1, wherein the optical axis of each of the sensor modules is maintained during the rotations of the sensor module.

4. The imaging apparatus of claim 1, wherein the frame has a plurality of surfaces facing different directions, and the sensor modules are respectfully mounted on the surfaces to have the different optical axes.

5. The imaging apparatus of claim 1, wherein the processor is further configured to:
determine a photographing mode of the imaging apparatus to be one of a first photographing mode and a second photographing mode based on a signal transmitted from a user terminal; and
rotate the sensor modules in response to the determined photographing mode.

6. The imaging apparatus of claim 1, wherein the sensor modules are mounted on the frame such that that optical axes between two adjacent sensor modules have a certain angle.

7. The imaging apparatus of claim 1, wherein each of the sensor modules comprises a base stopper configured to restrict a rotating angle thereof by contacting a frame stopper included in the frame on a moving path of the sensor module according to the rotation of the sensor module, and wherein the frame comprises the frame stopper configured to restrict the rotating angle of each of the sensor modules by contacting the base stopper.

8. The imaging apparatus of claim 7, wherein the base stopper allows the adjacent sensor modules to rotate in opposite directions to each other.

9. The imaging apparatus of claim 7, wherein the sensor included in each of the sensor modules comprises an imaging area having a rectangular shape defined by a side having a long length and a side having a short length, wherein each of the sensor modules is configured to obtain the image by sequentially exposing the imaging area of the sensor in a short-length direction in units of pixel rows, and wherein the base stopper comprises:

a first base stopper configured to maintain rotated states of the sensor modules such that sides of the long length are adjacent to each other between the imaging areas of the sensors of adjacent sensor modules by contacting the frame stopper; and a second base stopper configured to maintain rotated states of the sensor modules such that sides of the short length are adjacent to each other between the imaging areas of sensors of adjacent sensor modules by contacting the frame stopper.

10. An imaging apparatus comprising:

a plurality of sensor modules each of which comprises a sensor and a lens configured to rotate about a different optical axis to obtain an image according to one of a plurality of photographing modes; and a processor configured to control the rotation of the sensor modules, and connect the images obtained by the sensor modules to generate a connected image, wherein the photographing modes comprise:

a first photographing mode in which the connected image is generated by connecting long sides of the images obtained by the sensors of two adjacent sensor modules; and a second photographing mode in which the connected image is generated by connecting short sides of the images obtained by the sensors of two adjacent sensor modules.

11. The imaging apparatus of claim 10, wherein in at least one of the first and second photographing modes, the processor is configured to control the rotation of the sensor modules such that an exposure time of a side portion of an imaging area of a sensor of a first sensor module among the sensor modules is synchronized with an exposure time of a side portion of an imaging area of a sensor of a second sensor module adjacent to the first sensor module among the sensor modules.

12. An imaging method performed by an imaging apparatus comprising a plurality of sensor modules each of which comprises a sensor and a lens having a different optical axis, the imaging method comprising:

determining a photographing mode of the imaging apparatus from among at least one of photographing mode;

controlling, according to the determined photographing mode, each of the sensor modules to obtain an image by sequentially exposing a rectangular-shaped imaging area of the sensor in a short-length direction in units of pixel rows; and generating a connected image based on the images obtained by the sensor modules, wherein the photographing mode comprises first and second photographing modes, and wherein, in the first photographing mode in which the sensor modules rotate such that sides having a long length in the imaging areas of the sensors of two adjacent sensor modules are adjacent to each other, the image is obtained by sequentially exposing the imaging area of the sensor in the short-length direction so that exposed areas on the imaging areas of the sensors of the two adjacent sensor modules move away from or closer to each other.

13. The imaging method of claim 12, wherein the photographing mode is determined based on a photographing mode control signal transmitted from a user terminal.

14. The imaging method of claim 13, wherein each of the sensor modules is controlled to obtain the image by rotating about the optical axis, based on the photographing mode control signal.

15. The imaging method of claim 12, wherein, in the first photographing mode, the connected image is obtained based on a viewing angle expanded in a long-length direction of the imaging area.

16. The imaging method of claim 12, wherein in the second photographing mode in which the sensor modules rotate such that sides having a short length in the imaging areas of the sensors of two adjacent sensor modules are adjacent to each other, the image is obtained by sequentially exposing the imaging area of the sensor in the short-length direction so that exposed areas on the imaging areas of the sensors of the sensor modules move in a same direction.

17. The imaging method of claim 16, wherein, in the second photographing mode, the connected image is obtained based on a viewing angle expanded in a short-length direction of the imaging area.

* * * * *